May 20, 1952  H. M. CHASE  2,597,067
PROCESS FOR PREPARING AND PRESERVING POTATOES
Filed Sept. 13, 1949  2 SHEETS—SHEET 2
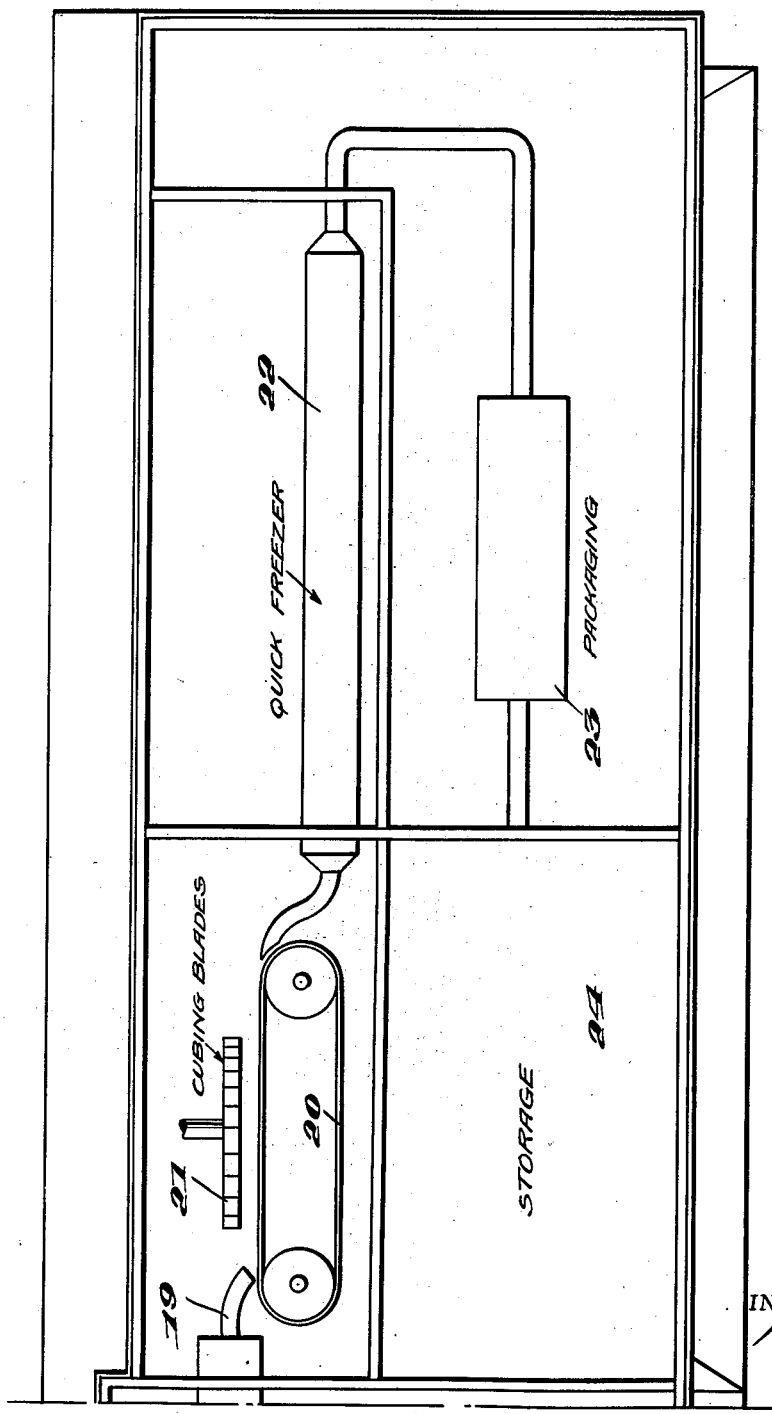
INVENTOR.
HENRY M. CHASE,
Robert B. Carson
ATTORNEY Patented May 20, 1952

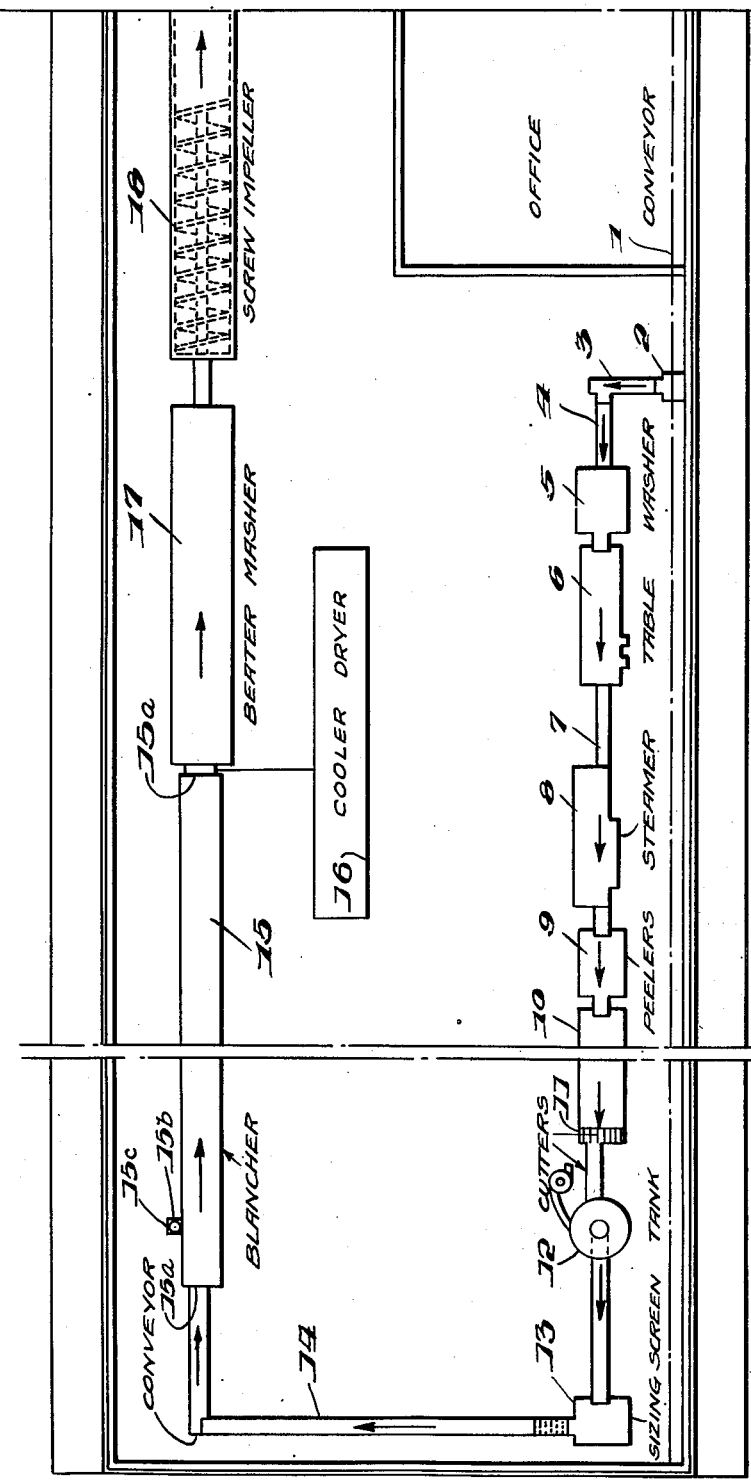

2,597,067

UNITED STATES PATENT OFFICE 2,597,067

PROCESS FOR PREPARING AND PRESERVING POTATOES

Henry M. Chase, Nampa, Idaho, assignor to Arthur M. Chase, Nampa, Idaho

Application September 13, 1949, Serial No. 115,499

2 Claims. (Cl. 99—193)

In my application Serial No. 96,421, filed June 1, 1949, I described and claimed certain contributions which I have made to the art of treating and preparing potatoes, particularly quick frozen potatoes. Improvements in the invention described in that application are set forth in another application Serial No. 115,498, filed concurrently with the present application on September 13, 1949.

The present invention relates to a new product in the form of mashed potatoes in frozen condition, and one object of the invention is to provide such a product.

Another object of the invention is to provide a novel process for preparing the new product.

A further object of the invention is to provide mashed potatoes in frozen condition and ready for serving with little more preparation than thawing and heating.

These and other objects of the invention will be readily understood by reference to the following specification taken in conjunction with the accompanying drawings, in which:

Fig. 1 is a diagrammatic showing of part of a processing plant for carrying out the invention;

Fig. 1A is a continuation of the diagrammatic showing in Fig. 1 of the process plant for carrying out the invention; and Fig. 2 is a perspective view of a cube of frozen mashed potatoes.

In many instances it is advisable as a preliminary step to processing as will be described, to store the fresh potatoes in conditioning rooms or the like where the temperature can be regulated for heat and cold. As the potatoes are placed in such rooms, they are tested for sugar content so that it can be ascertained how long it will be necessary to store the potatoes in a warm room (for example at 70° F.) in order to change the excess sugar to starch and to render the potatoes in proper condition for the process which will now be described.

Sugar in excess of 1% by weight renders a potato unfit for deep frying and adversely affects it with regard to other types of cooking. At the time of harvesting most late varieties of potato have a sugar content of less than 1%, but when stored in cool storage, enough starch is converted to sugar to necessitate reconversion to render the potato desirable for processing and subsequent cooking. I condition the potatoes to convert excess sugar to starch by storing at a temperature of 70°–85° F. for 10–20 days, depending upon the sugar content of the particular lot.

If the potatoes contain 3% sugar 17–18 days of storage at 70° F. or 14–15 days at 80–85° F. will be desirable. The 70° F. storage is preferred as sprouting does not start as quickly.

After such preliminary conditioning mentioned, the potatoes are conveyed into the processing plant shown in the drawings by means of a belt line conveyor indicated by the reference numeral 1. This belt line conveyor 1 delivers the potatoes to the elevator 2 which elevates them to a master distributing conveyor 3. The conveyor 3 in turn feeds the processing line through the medium of a short belt line conveyor 4, which in the first instance conveys the potatoes to a washer indicated by the reference numeral 5.

The washer 5 is a cleaning apparatus which is provided with revolving fiber brushes. The potatoes are also subjected here to a heavy cold water spray with a pressure of about 80 pounds. The potatoes are thus cleaned by the revolving fiber brushes under the heavy water spray in this washer 5 and are then dropped onto a sorting table 6 where all waste is picked out. The potatoes then drop down to conveyor 7 by which they are transported to the steamer 8.

In the steamer 8, which may be in the form of a drum, the potatoes are steamed for one-half to three-quarters minutes at a steam pressure of about 100 pounds. The steamer may be batch or continuous. There are several on the market. The time that the potatoes are in the steamer depends on their temperature at the time they enter the steamer. For example, if they are at 70° F. when they enter the steamer it is only necessary that they remain in the steamer one-half minute. If the temperature is a little colder they remain a little longer.

From the steamer 8 the potatoes are dropped into the washer-peeler indicated by the reference numeral 9. This washer-peeler 9 is preferably of a round type with revolving soft fiber brushes which are adapted to engage the thin outer skin of the potatoes. At the same time that the fiber brushes operate on the potatoes the potatoes are under a heavy ice-water spray. This ice-water spray processing which follows the steaming in the steamer 8 at 100 pound steam pressure, effects a sudden change in temperature and "shocks" the thin outer skin off the potatoes. Moreover, with the rolling action of this washer-peeler (which in the example shown is about 12 feet long), the potatoes rub against each other thereby exposing all outside skin to the fiber revolving brushes, until all of the thin outer skin is removed without disturbing any of the inner covering, thereby saving all of the nutritive content of the potato, or the vitamins. This is important since, it is understood, most of the food value in potatoes, aside from the starch, is contained in the outer three-eighths of an inch. By this sudden shock method, and with the aid of the soft fiber brushes, the skin is removed without cooking into the potato as is the case in most known processing lines.

From the washer-peeler 9 the potatoes pass to the specking or clean-up tables 10 where operators manually trim all eyes and specks. Fresh water troughs on either side of the tables permit the operators to dip the potatoes therein so that when the potatoes leave this table they are entirely clean and ready to be cut into the various sizes and shapes.

From the tables 10 the potatoes are elevated to the strip cutters 11 where they are cut into strips preferably about 3/8 inch square and running the full length of the potato.

The cutting machines then drop the cut pieces of potatoes into the tanks 12, which contain fresh water, which is kept agitated by a fast moving pump. The action of the water with this high agitation removes the outside starch so that the potatoes will separate and not stick together. The washing time is 3–4 minutes. The cut potatoes tend to settle to the bottom of the tank and then pass out on a conveyor or belt to the sizing screens 13, which is a round barrel shaped machine with long narrow slits so spaced that the thin slices are allowed to drop through onto a conveyor belt which carries the off sizes to the hash-brown cutters.

From the end of the sizing device 13 the potato strips are elevated to a belt conveyor 14 which delivers them to the blanchers 15. In the processing plant illustrated diagrammatically, blancher 15 is about 72 feet long and is provided preferably with a stainless steel web belt or the like mounted on rollers which passes completely through the blancher and on through the adjacent cooler-dryer 16.

In the blanchers 15 there are a succession of live steam jets spaced along the line. The potatoes are exposed to the live steam for somewhat longer than the three minutes specified in my co-pending applications, and the temperature in the blanchers is raised to 250°–1300° F., the temperature and time of treatment being coordinated so that the potato strips will be just cooked through. For potatoes in 3/8" square strips, 6–7 minutes cooking is needed. Samples are taken through small side doors (not shown) in the blanchers and the operator adjusts the speed of travel of the belt carrying the potatoes and also the steam to accomplish correct cooking.

These blanchers 15 are almost steam tight with heavy drop curtains 15a at each end and a pressure valve 15b in the steam escape stack 15c, in order to maintain proper even heat without actually building up a steam pressure.

From the blanchers 15 the lines continue, as indicated, to the air cooler-dryer 16. These air-cooler-dryers are each provided with a series of many air fans running at high speeds, forcing direct air currents from many angles, so as to remove all surface moisture from the cut potatoes, and more, the action of these fans, partly dry the potatoes to a point where they contain about 65–68% moisture, approximately 10 to 15% less than when the potatoes are freshly cut. (Fresh potatoes contain about 78% water and 22% solids, mostly starch.) These air cooler-dryers 16 in the embodiment shown diagrammatically are about 40 feet long.

By having been cooked through prior to treatment in the cooler-dryer 16, the potatoes are just right for transfer to a masher-beater 17 from the end of the conveyor which extends into 16. Nothing is added for seasoning.

In the masher-beater 17, the potatoes are beaten until they become a white, fluffy mass, and they are then transferred to an extruding machine 18 then through an orifice 19 and out in a sheet about 1/2 inch thick onto a wide stainless steel apron 20 where cutter blades 21 descend to cut the potatoes into cubes which are about 1/2 inch on a side. The cubes, one of which is shown at 25 in Fig. 2, are then transferred to the freezing line and quick freezer 22 where they are frozen.

In the quick freezing tunnels 22, the cubes are subjected to quick freeze temperatures of an average of −25° F.

The temperature at the intake is about −30° F., at the outlet, −20° F., all below zero. When they come out of the quick-freeze tunnels they are then conveyed to packing machines 23, which package the frozen potatoes and from which they are then conveyed to a zero degree temperature storage room.

I have found that potatoes so treated will keep for many months without any change in condition when stored at zero temperature.

These mashed potatoes may be frozen in other forms, however, I have found that they freeze much faster in small cubes than in larger sizes. These mashed potato cubes are ideal for the housewife as well as the institutional user. By placing the desired amount of mashed potato cubes in a double boiler for a few minutes they are thawed and hot, and ready to whip up and season, and will be just as light and fluffy as fresh potatoes, in fact they are much better than most common mashed potatoes, having been conditioned for sugar and starch before processing. There have been other mashed potatoes on the market, but they have not been very satisfactory because they all seem to have too much water left in them, and after freezing when they are heated to serve and cream or milk is added they become very sloppy. Where the milk or cream are added before freezing they will be too wet when heated to serve. Mashed potato cubes made in accordance with my invention are not hurt at all if they should thaw before the housewife puts them in the double boiler.

By the herein described method of processing, especially through the action of my cooler-dryer, I remove the excess water in the potato and add very much to the preservative quality of the product. These mashed cubed potatoes will stay white and fluffy many hours after they are ready to serve, whereas fresh potatoes will only stay good to serve for about one hour or an hour and a half at the outside. This is a very important factor especially to the restaurant or hotel, as they do not have to prepare mashed potatoes nearly as often, and they eliminate their waste by not having to prepare more than can be expected to be served in a given time. They can be packed in several sized packages in order to serve both the housewife and larger user.

I claim:

1. A continuous process for preparing and preserving white potatoes, comprising the steps of removing the skin, cutting the potatoes into strips, washing the strips in rapidly agitated fresh water, blanching the potatoes at a temperature of 250°–300° F. for at least three minutes to cook the strips just through, subjecting the cooked strips to air currents to reduce the moisture content, beating the potatoes to a fluffy mass, forming the beaten potatoes into small cubes, and then quick freezing the cubes at a temperature of from −20° to −30° F.

2. A process according to claim 1 with the preliminary step of storing the potatoes at about 70° F. for 10 to 20 days to convert excess sugar to starch.

HENRY M. CHASE.

REFERENCES CITED

The following references are of record in the file of this patent:

UNITED STATES PATENTS

| Number | Name | Date |
| --- | --- | --- |
| 2,166,278 | Alderfer | July 18, 1939 |
| 2,401,392 | Ware | June 4, 1946 |
| 2,477,605 | Howard et al. | Aug. 2, 1949 |

OTHER REFERENCES

"Quick Frozen Foods," June 1949, page 45.